United States Patent
Horie et al.

(10) Patent No.: US 12,543,937 B2
(45) Date of Patent: Feb. 10, 2026

(54) ENDOSCOPE

(71) Applicant: OLYMPUS MEDICAL SYSTEMS CORP., Tokyo (JP)

(72) Inventors: Satoshi Horie, Kokubunji (JP); Eijiro Sato, Hachioji (JP)

(73) Assignee: Olympus Medical Systems Corp., Tokyo (JP)

( * ) Notice: Subject to any disclaimer, the term of this patent is extended or adjusted under 35 U.S.C. 154(b) by 590 days.

(21) Appl. No.: 17/960,302

(22) Filed: Oct. 5, 2022

(65) Prior Publication Data

US 2023/0113437 A1 Apr. 13, 2023

Related U.S. Application Data (60) Provisional application No. 63/253,713, filed on Oct. 8, 2021.

(51) Int. Cl.
*A61B 1/015* (2006.01)
*A61B 1/00* (2006.01)
*A61B 1/12* (2006.01)

(52) U.S. Cl.
CPC .......... *A61B 1/015* (2013.01); *A61B 1/00068* (2013.01); *A61B 1/00094* (2013.01); *A61B 1/00091* (2013.01); *A61B 1/126* (2013.01)

(58) Field of Classification Search
CPC . A61B 1/015; A61B 1/00068; A61B 1/00089; A61B 1/00094; A61B 1/00091; A61B 1/00098; A61B 1/12; A61B 1/126; A61B 1/0008; A61B 1/00082;

(Continued)

(56) References Cited

U.S. PATENT DOCUMENTS

2006/0195016 A1 8/2006 Fujikura
2009/0253964 A1* 10/2009 Miyamoto ......... G02B 23/2476
600/157

(Continued)

FOREIGN PATENT DOCUMENTS

JP 2006-230950 A 9/2006
JP 2006-247261 A 9/2006

(Continued)

*Primary Examiner* — Michael J Carey
*Assistant Examiner* — Olivia Grace Starkey
(74) *Attorney, Agent, or Firm* — Morgan, Lewis & Bockius LLP (57) ABSTRACT

An endoscope comprises: an insertion portion comprising a distal end portion, the distal end portion including a distal end surface; a flow passage formed in the insertion portion, the flow passage including a fluid ejection port formed in the distal end surface and the flow passage configured to supply a fluid via the fluid ejection port to an environment outside of the insertion portion; and a suction passage formed in the insertion portion, the suction passage including a suction port formed in the distal end surface. The distal end surface includes a deflection surface formed integrally with the distal end portion. The deflection surface covers a part of the fluid ejection port. The deflection surface is positioned so that the fluid supplied via the fluid ejection port contacts the deflection surface and is deflected in a first direction. The first direction does not intersect the suction port.

17 Claims, 10 Drawing Sheets

(58) Field of Classification Search
CPC ............ A61B 1/00085; A61B 1/00087; A61B 1/00096; A61B 1/00097; A61B 1/00101
See application file for complete search history.

(56) References Cited

U.S. PATENT DOCUMENTS

| | | | |
|---|---|---|---|
| 2011/0046446 A1* | 2/2011 | Hirayama | A61B 1/00091 600/158 |
| 2014/0094659 A1* | 4/2014 | Hamazaki | G02B 23/2476 600/157 |
| 2014/0275762 A1* | 9/2014 | Irby, III | A61B 17/22 600/103 |
| 2017/0215965 A1* | 8/2017 | Harrah | A61B 1/018 |
| 2019/0357762 A1* | 11/2019 | Clayman | A61B 1/00042 |
| 2021/0085158 A1 | 3/2021 | Ikuma et al. | |
| 2021/0177249 A1* | 6/2021 | Watanabe | A61B 1/12 |

FOREIGN PATENT DOCUMENTS

| | | |
|---|---|---|
| JP | 2015-029764 A | 2/2015 |
| JP | 2020-156902 A | 10/2020 |
| WO | 2019/176171 A1 | 9/2019 |

\* cited by examiner

ENDOSCOPE

RELATED APPLICATION DATA

This application is based on and claims priority under 35 U.S.C. § 119 to U.S. Provisional Application No. 63/253,703 filed on Oct. 8, 2021, the entire contents of which are incorporated herein by reference.

FIELD OF THE DISCLOSURE

The present disclosure relates to an endoscope having a liquid feeding function and a suction function.

BACKGROUND

In recent years, endoscopes in which an objective lens, a liquid feeding nozzle, a suction channel opening, etc., are provided at a distal end of an elongated insertion portion, which is an insertion body, have been known. For example, Japanese Patent Application Laid-Open Publication No. 2020-156902 discloses a liquid feeding nozzle technique that enables an observation optical system in a distal end portion of an endoscope to be sufficiently cleaned.

SUMMARY OF THE DISCLOSURE

An endoscope according to an aspect of the present disclosure comprises: an insertion portion comprising a distal end portion, the distal end portion including a distal end surface; a flow passage formed in the insertion portion, the flow passage including a fluid ejection port formed in the distal end surface and the flow passage configured to supply a fluid via the fluid ejection port to an environment outside of the insertion portion; and a suction passage formed in the insertion portion, the suction passage including a suction port formed in the distal end surface. The distal end surface includes a deflection surface formed integrally with the distal end portion. The deflection surface covers a part of the fluid ejection port. The deflection surface is positioned so that the fluid supplied via the fluid ejection port contacts the deflection surface and is deflected in a first direction. The first direction does not intersect the suction port.

An endoscope according to an aspect of the present disclosure comprises: a distal end portion provided in a distal end of an insertion portion, the distal end portion including a distal end surface; a flow passage formed in the distal end portion, the flow passage including a fluid ejection port formed in the distal end surface and wherein the flow passage is configured to deliver the fluid to the fluid ejection port and the fluid ejection port is configured to eject the fluid; a suction passage formed in the distal end portion, the suction passage including a suction port formed in the distal end surface; and a deflection surface formed integrally with the distal end portion. The fluid ejection port has a first central point and the suction port has a second central point. The deflection surface covers a part of a first area of the fluid ejection port. The first area of the fluid ejection port is an area of the fluid ejection port that is on a radially inner side of an imaginary line orthogonal to a straight line connecting the first central point and the second central point.

DETAILED DESCRIPTION

Here, examples of an endoscope of the present disclosure will be described. Note that in the following description, the drawings based on the respective embodiments are schematic ones and, e.g., a relationship between a thickness and a width of each part and ratios in thickness among the respective parts are different from actual ones, and parts that are different in dimensional relationship and ratio depending on the drawings may be included in the drawings.

Also, each of the examples of the endoscope in the following description is a urological endoscope including a small-diameter insertion portion. However, the endoscope is not limited to the examples and is applicable to various types of endoscopes including what are called flexible endoscopes each including a flexible insertion portion that is inserted to a digestive organ of an upper part or a lower part of a living body and what are called rigid endoscopes each including a rigid insertion portion that is used for surgery.

Figure 1:
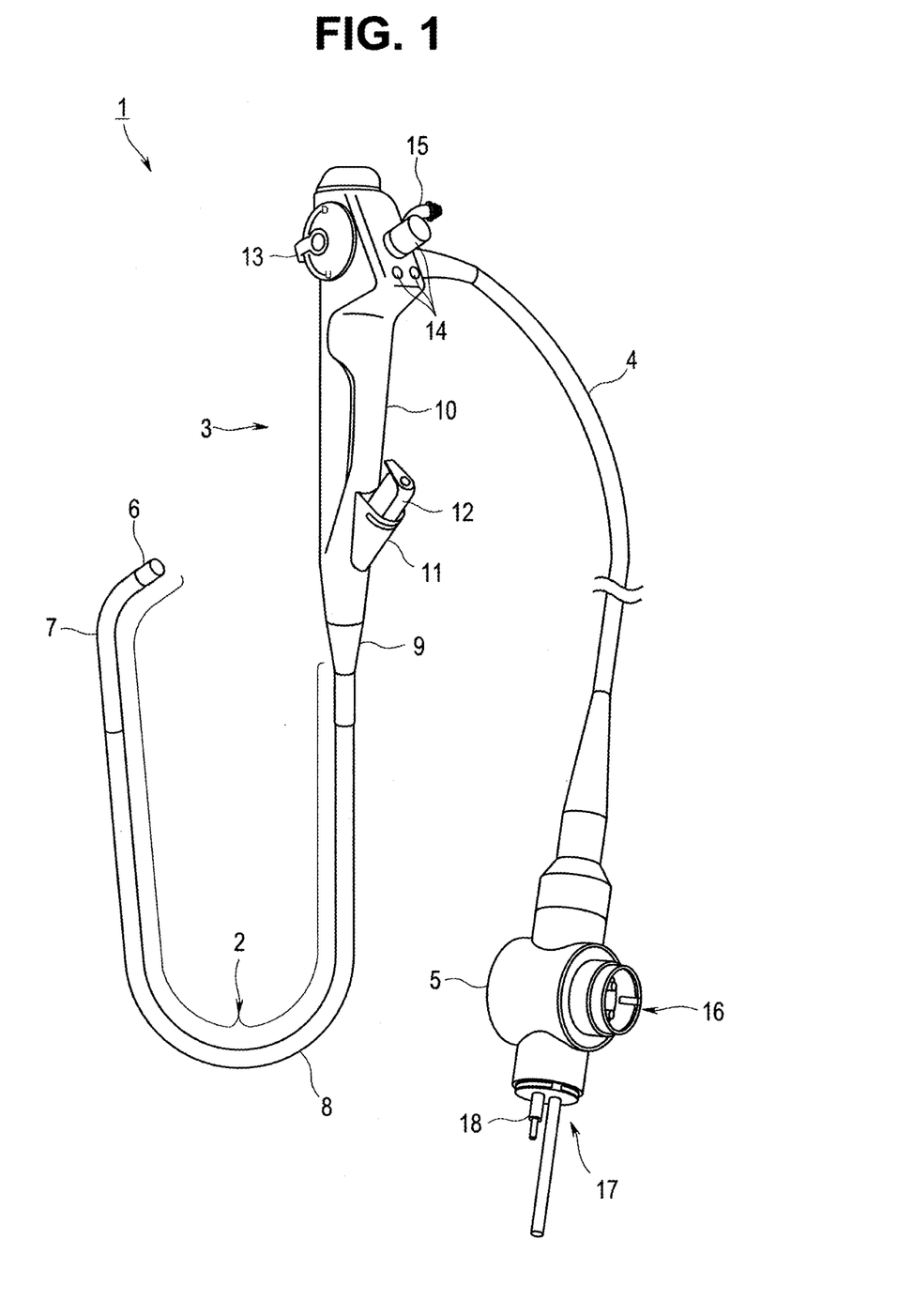
FIG. 1 is a plan view of an outer appearance of an endoscope according to an embodiment of the present disclosure.

An endoscope of an embodiment of the present disclosure will be described below with reference to the drawings. As illustrated in FIG. 1, an endoscope 1, which is an electronic endoscope according to the present embodiment, mainly includes, e.g., an insertion portion 2 formed in an elongated tube shape, an operation portion 3 provided in such a manner as to be continuous with a proximal end of the insertion portion 2, a universal cord 4, which is an endoscope cable provided in such a manner as to extend from the operation portion 3, and an endoscope connector 5 disposed at a distal end of the universal cord 4.

For reasons such as infection prevention and cost reduction, it is preferable that the endoscope 1 be a disposable single-use endoscope that is disposed of after use. However, it is a matter of course that the endoscope 1 may be a reused product disinfected and sterilized for reuse.

The insertion portion 2 is a flexible tubular member formed by a distal end portion 6, a bending portion 7 and a flexible tube portion 8 being provided continuously in the order mentioned from the distal end side. From among the members, inside the distal end portion 6, e.g., an image pickup module, which is image pickup means, and illumination means are received and disposed.

The bending portion 7 is a mechanism section that can be actively bent in two, up and down, directions (UP-DOWN) of the insertion portion 2 by an operation of turning a bending lever 13 from among operation members of the operation portion 3.

Note that the bending portion 7 is not limited to a bending portion of a type in which the bending portion actively bends two, up and down, directions, and may be a bending portion of a type in which the bending portion can bend in four directions including left and right directions in addition to up and down directions (all circumferential directions around an axis, UP-DOWN/LEFT-RIGHT, via up-down/left-right operations) or a bending portion of a type in which the bending portion can bend only in one direction, an up (UP) direction, and furthermore, may be a bending portion of a type in which there is no mechanism that makes the bending portion actively bend via a bending lever 13 and the bending portion just passively bends.

The flexible tube portion 8 is a tubular member that is flexible enough to be passively flexed. Inside the flexible tube portion 8, e.g., a later-described signal cable bundle extending from the image pickup module incorporated in the distal end portion 6 and further extending from the operation portion 3 to the inside of the universal cord 4 and a later-described light guide bundle guiding illuminating light from a light source apparatus and outputting the illuminating light from the distal end portion 6 are inserted (neither of which is illustrated) in addition to a later-described channel.

The operation portion 3 includes: e.g., a bend preventing portion 9 provided on the distal end side, the bend preventing portion 9 covering a proximal end of the flexible tube portion 8 and being connected to the flexible tube portion 8; a grasping portion 10 provided in such a manner as to be continuous with the bend preventing portion 9, the grasping portion 10 being grasped by a hand of a user when the user uses the endoscope 1; operation means for operating various endoscope functions, the operation means being provided on an outer surface of the grasping portion 10; a treatment instrument insertion portion 11; and a suction valve 15.

Examples of the operation means provided on the operation portion 3 include, e.g., the bending lever 13 for performing a bending operation of the bending portion 7, and a plurality of operation members 14 for performing a liquid feeding (gas feeding) operation or a suction operation, or respective operations for the image pickup means, the illumination means, etc.

The treatment instrument insertion portion 11 is a component part including a treatment instrument insertion port for insertion of various treatment instruments (not illustrated) and communicating with the channel (not illustrated) via a branching member inside the operation portion 3.

In the treatment instrument insertion portion 11, a forceps plug 12 that is a cover member for opening/closing the treatment instrument insertion port and that is detachably (replaceably) attached to the treatment instrument insertion portion 11 is disposed. Note that the channel also communicates with the suction valve 15 via a branching member inside the operation portion 3.

The universal cord 4 is a composite cable in which, e.g., the signal cable bundle and the light guide bundle for delivering illuminating light from the light source apparatus (not illustrated) are inserted. The signal cable bundle, the light guide bundle, etc., are inserted in such a manner as to extend from the distal end portion 6 of the insertion portion 2 to the inside of the operation portion 3 and the inside of the universal cord 4.

The endoscope connector 5 includes an electric connector portion 16 to which a signal cable for connection with a video processor (not illustrated), which is an external apparatus, is connected, at a side portion, and also includes, e.g., a light source connector portion 17 to which the later-described light guide bundle and an electric cable (not illustrated) for connection with the light source apparatus, which is an external apparatus, are connected, and a liquid feeding (gas feeding) plug 18 to which a liquid feeding (gas feeding) tube (not illustrated) from a liquid feeding (gas feeding) apparatus (not illustrated), which is an external apparatus, is connected.

Here, a configuration of a distal end part of the insertion portion 2 of the endoscope 1 of the present embodiment will be described below with reference to FIGS. 2 to 5. In the following description, description of known components of the insertion portion 2 will be omitted.

Figure 2:
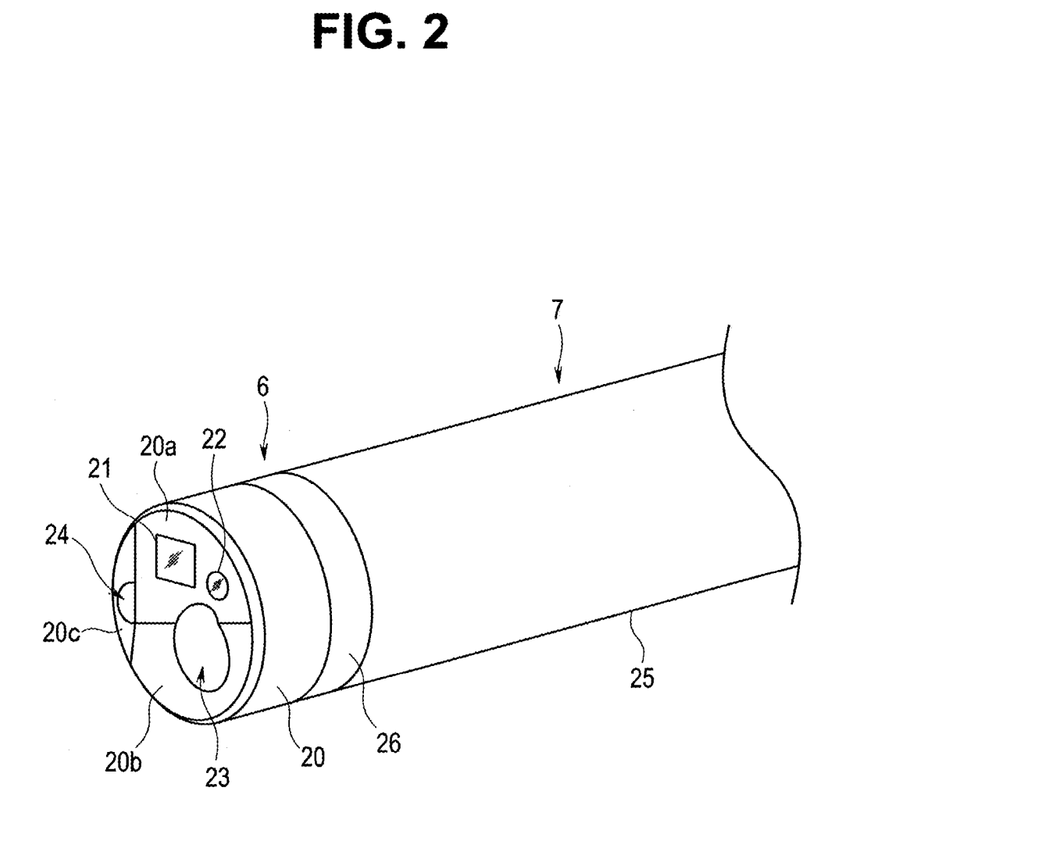
FIG. 2 is a perspective view illustrating a configuration of a distal end part of an insertion portion, which is an insertion body, according to the aspect of the present disclosure.

As illustrated in FIG. 2, the distal end portion 6 of the insertion portion 2 includes a distal end rigid portion 20, which is a distal end component part that is a substantially columnar block-body frame component in which an observation window 21, an illumination window 22 and a channel opening 23 are provided. A part from an intermediate point to the proximal end side of the distal end rigid portion 20 is covered by bending rubber 25 and a distal end of the bending rubber 25 is fixed to the distal end rigid portion 20 via a yarn-wrapped bonding portion 26.

The distal end rigid portion 20 is a resin frame formed via, e.g., injection molding (mold forming). Also, the distal end rigid portion 20 may be a metal frame formed by, e.g., cutting of a biocompatible metal such as stainless steel.

Figure 3:
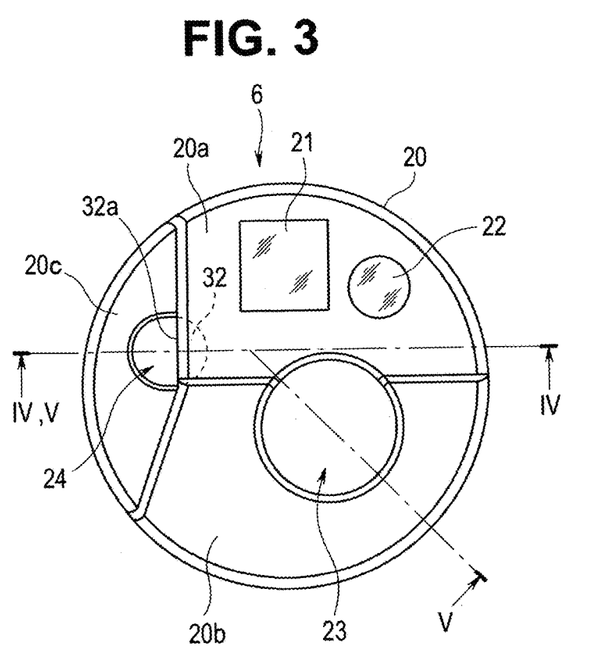
FIG. 3 is a front view illustrating a configuration of a distal end portion of an insertion portion, which is an insertion body, according to the aspect of the present disclosure.

As illustrated in FIG. 3, the distal end rigid portion 20 included in the distal end portion 6 includes three, first to third, surfaces 20a to 20c at a distal end surface. In the first surface 20a, the observation window 21, the illumination window 22 and a part of the channel opening 23 are disposed. Also, in the second surface 20b, the other part of the channel opening 23 is disposed. Furthermore, in the third surface 20c, a liquid feeding opening 24, which is a fluid ejection opening, is disposed. The suction port 23 can be formed in one or more of the first surface 20a and the second surface20b. The first surface 20a is orthogonal to a longitudinal direction of the insertion portion 2, and the second surface 20b is inclined with respect to the first surface. The second surface 20b is inclined with a circumferential edge of the second surface being more proximal than a radially innermost edge of the second surface. The third surface 20c is inclined with respect to the first surface 20a. The third surface 20c is inclined with a circumferential edge of the third surface being more proximal than a radially innermost edge of the third surface 20c. The first surface 20a being orthogonal to a longitudinal direction of the insertion portion 2 includes surfaces that have the same effect as this disclosure within the limits of design error. The fluid ejection port 24 and the suction port 23 are spaced apart from a longitudinal axis of the distal end portion 20.

Figure 4:
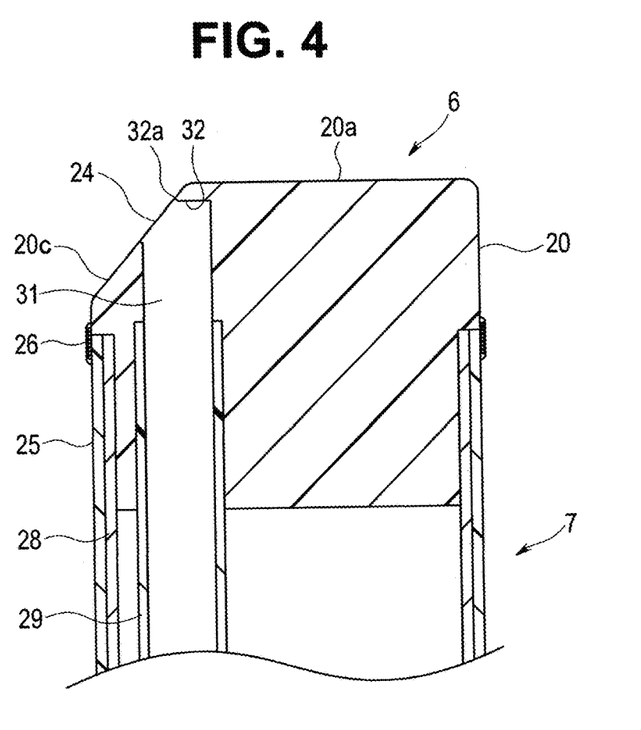
FIG. 4 is a sectional view illustrating a configuration of the distal end part of the insertion portion along line IV-IV in FIG. 3, according to the aspect of the present disclosure.

As illustrated in FIG. 4, a distal end part of a bending tube 28 provided inside the bending portion 7 is fitted on the distal end rigid portion 20 and is covered by the bending rubber 25 in such a manner that the bending rubber 25 covers an outer circumference of the bending tube 28. A non-illustrated netted tube-shape braid is provided between the bending tube 28 and the bending rubber 25.

Also, in the distal end rigid portion 20, a liquid feeding passage 31, which is a flow passage that opens in the form of the liquid feeding opening 24 in the third surface 20c, is formed. A liquid feeding tube 29, which is a fluid tube, is communicably connected to the liquid feeding passage 31. That is, the flow passage 31 is formed in the distal end portion 20, and the flow passage 31 is configured to feed a fluid to the fluid ejection port 24 formed in the distal end surface of the distal end portion 20.

Figure 5:
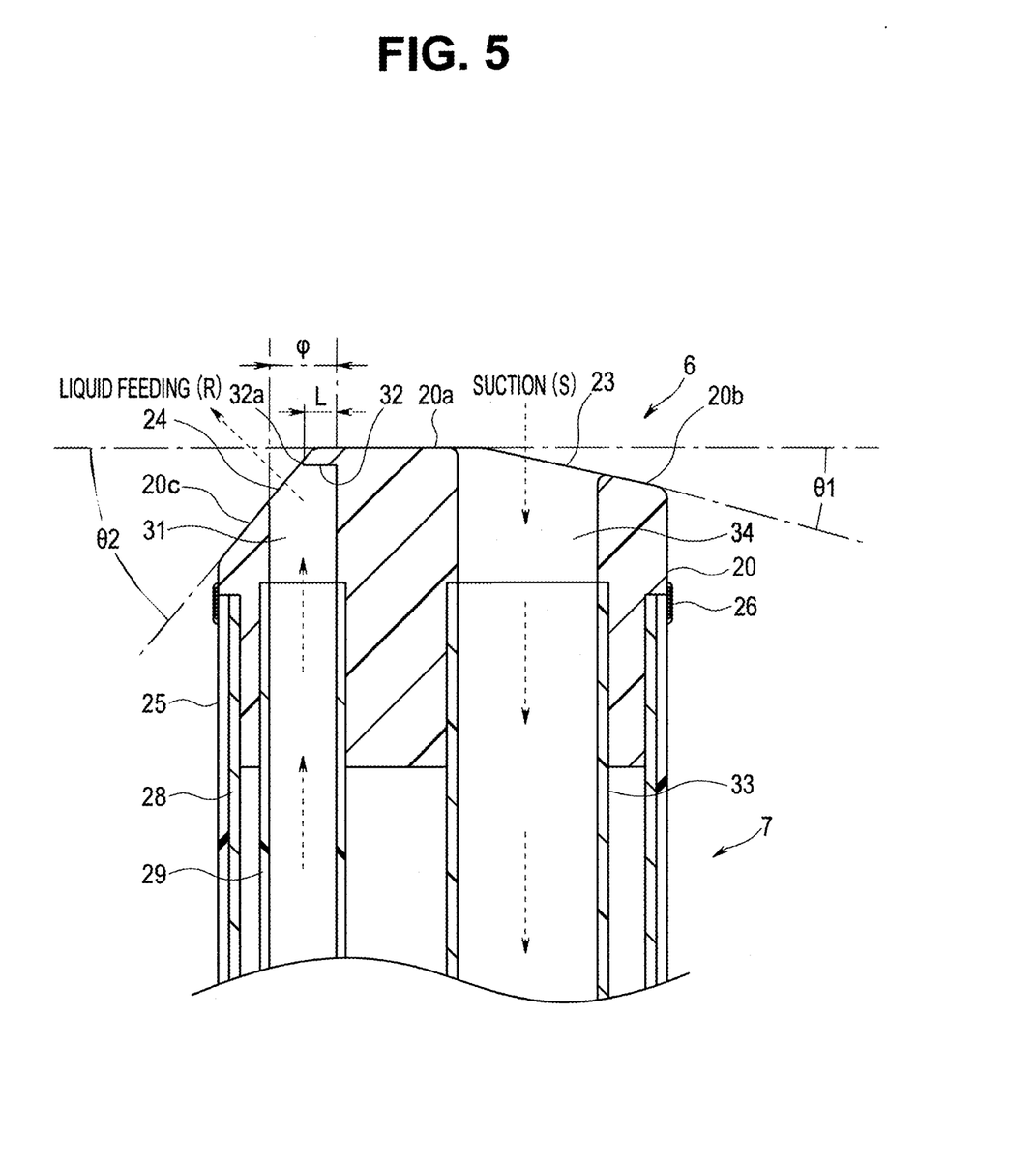
FIG. 5 is a sectional view illustrating a configuration of the distal end part of the insertion portion along line V-V in FIG. 3, according to the aspect of the present disclosure.

Furthermore, as illustrated in FIG. 5, in the distal end rigid portion 20, a suction passage 34 that opens in the form of the channel opening 23 in the first surface 20a and the second surface 20b and suctions a fluid to the inside of the insertion portion 2 (suction S) is formed. A tube-shape channel 33 is communicably connected to the suction passage 34. Note that the suction passage 34 and the channel 33 configure a treatment instrument insertion conduit for insertion of, e.g., a treatment instrument in addition to a suction conduit. That is, the suction port 23 is formed in the distal end surface, and the suction passage 34 is configured to suction the fluid from a suction port 23 to an inside of the insertion portion 2.

In the distal end rigid portion 20, here, the first surface 20a is a planar surface orthogonal to the longitudinal direction of the insertion portion 2, and the second surface 20b is an inclined surface inclined at a predetermined angle θ1 to the first surface 20a toward the proximal end side, and the third surface 20c is an inclined surface inclined at a predetermined angle θ2 to the first surface 20a toward the proximal end side. Here, the predetermined angle θ1 is more obtuse than the predetermined angle θ2. Also, the predetermined angle θ2 is set to, for example, an angle of 20 to 45 degrees. In other words, the third surface 20c is set to be inclined more largely than the second surface 20b.

Therefore, the distal end rigid portion 20 has what is called a bullet shape in which the second surface 20b and the third surface 20c are inclined in different outer circumferential directions and the distal end side is tapered. Consequently, the other part of the channel opening 23 provided in the second surface 20b and the liquid feeding opening 24 provided in the third surface 20c are set to face different directions.

Here, in the distal end rigid portion 20, a deflection surface 32 that closes a part of the liquid feeding opening 24 of the liquid feeding passage 31 to guide an ejection direction of liquid feeding R in which a fluid (mainly a liquid) is fed is formed on the inner side of the first surface 20a. The deflection surface 32 is a substantially semicircular projection portion extending in parallel with the first surface 20a in such a manner as to cover a part of the liquid feeding passage 31 and including a linear edge 32a. Viewed from the longitudinal direction of the distal end portion 20, a shape of the deflection surface 32 is so as to cover a part of the fluid ejection port 24. At least a part of the deflection surface 32 is formed in the first surface 20a. The flow passage 31 has a first diameter, and the fluid ejection port 24 has a second diameter, the deflection surface 32 covers a portion of the fluid ejection port 24 so that the second diameter is smaller than the first diameter. And an entire length of the flow passage 31 in the distal end portion 20 is a straight extending in the longitudinal direction of the distal end portion 20. For example, the ejection direction is on of a maximum value in direction of the fluid flux, a mean value in the direction of fluid flux, a median value in flux direction of the fluid flux, a mode value in the direction of fluid flux, a maximum value in direction of the fluid velocity, a mean value in the direction of fluid velocity, a median value in flux direction of the fluid velocity and a mode value in the direction of fluid velocity.

The deflection surface 32 has a predetermined projection amount L of projection toward a center of the liquid feeding passage 31 in such a manner as to cover an area that is 20% to 80% relative to a conduit diameter ϕ that is a diameter of the liquid feeding passage 31. Note that the projection amount L of the projection of the deflection surface 32 toward the center of the liquid feeding passage 31 is preferably 50% of the conduit diameter ϕ of the liquid feeding passage 31 (L=ϕ/2). The suction port 23 has a first central point, and the fluid ejection port 24 has a second central point. The deflection surface 32 covers a part of a first area of the fluid ejection port 24, and the first area of the fluid ejection port 24 is an area of the fluid ejection port 24 that is on a radially inner side of an imaginary line orthogonal to a straight line connecting the first central point and the second central point.

When a liquid such as purified water or normal saline fed from the liquid feeding tube 29 to the liquid feeding passage 31 collides with and is blocked by the deflection surface 32, the surface section 32 guides a direction of ejected liquid feeding R from the liquid feeding opening 24 in such a manner that the direction is guided away from the suction port 23.

In other words, in order to block and angle the liquid ejected linearly frontward from the distal end portion 6 of the insertion portion 2, the deflection surface 32 guides the ejection direction of the liquid feeding R to the outer (lateral) and obliquely front side of the distal end portion 6 so that the ejection direction is guided away from the suction port 23. The deflection surface 32 is positioned so that fluid ejected from the fluid ejection port 24 contacts the deflection surface 32 and is redirected in a first direction, the first direction does not intersect the suction port 23. And the first direction is inclined with respect to a longitudinal axis of the insertion portion.

Figure 6:
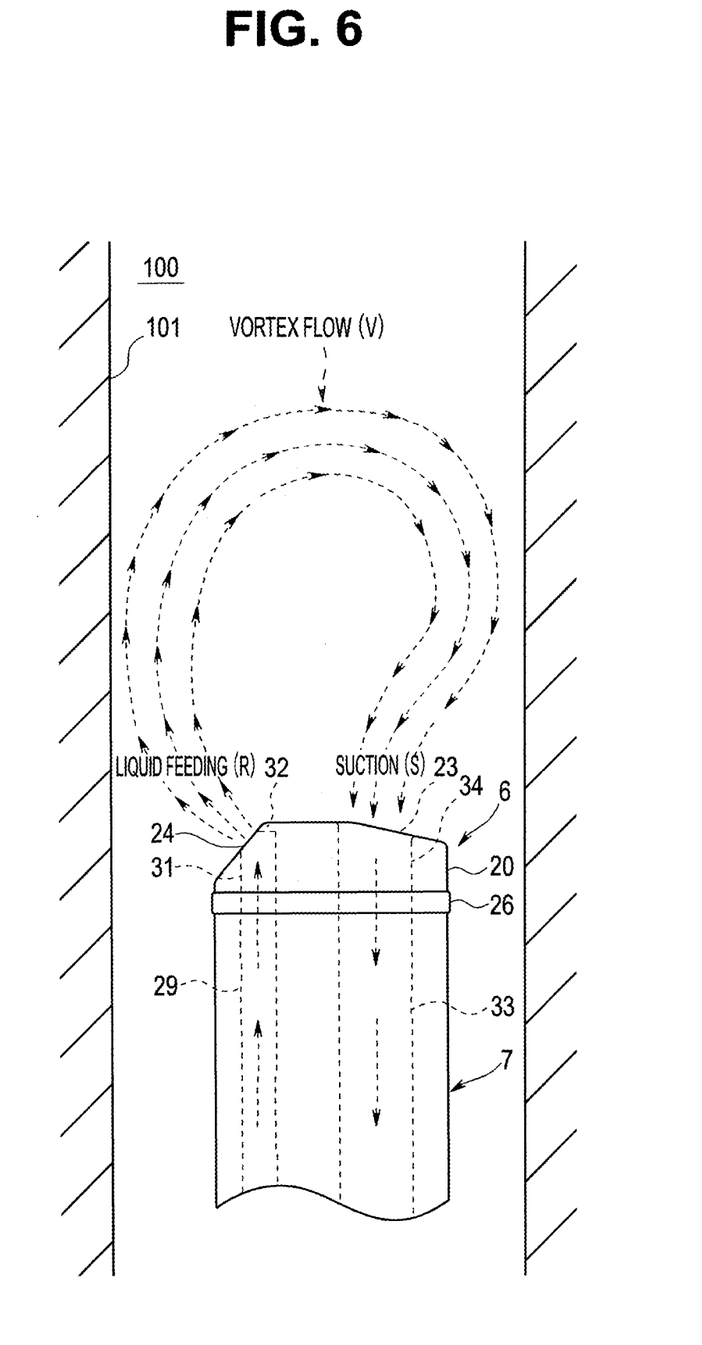
FIG. 6 is a diagram for describing a state in which a vortex flow is generated by liquid feeding and suction inside a body cavity, according to the aspect of the present disclosure.

More specifically, as illustrated in FIG. 6, in the endoscope 1, liquid feeding R of a liquid such as purified water or normal saline from the distal end portion 6 of the insertion portion 2 inserted in a body cavity 100 is performed. At this time, a direction of the liquid feeding R of the liquid ejected from the liquid feeding opening 24 of the distal end rigid portion 20 of the distal end portion 6 is guided by the deflection surface 32 to the outer (lateral) and obliquely front side so that the direction is guided away from the suction port 23. In other words, the fluid ejection direction is guided to a direction away from a position at which the suction port 23 is formed.

Figure 7:
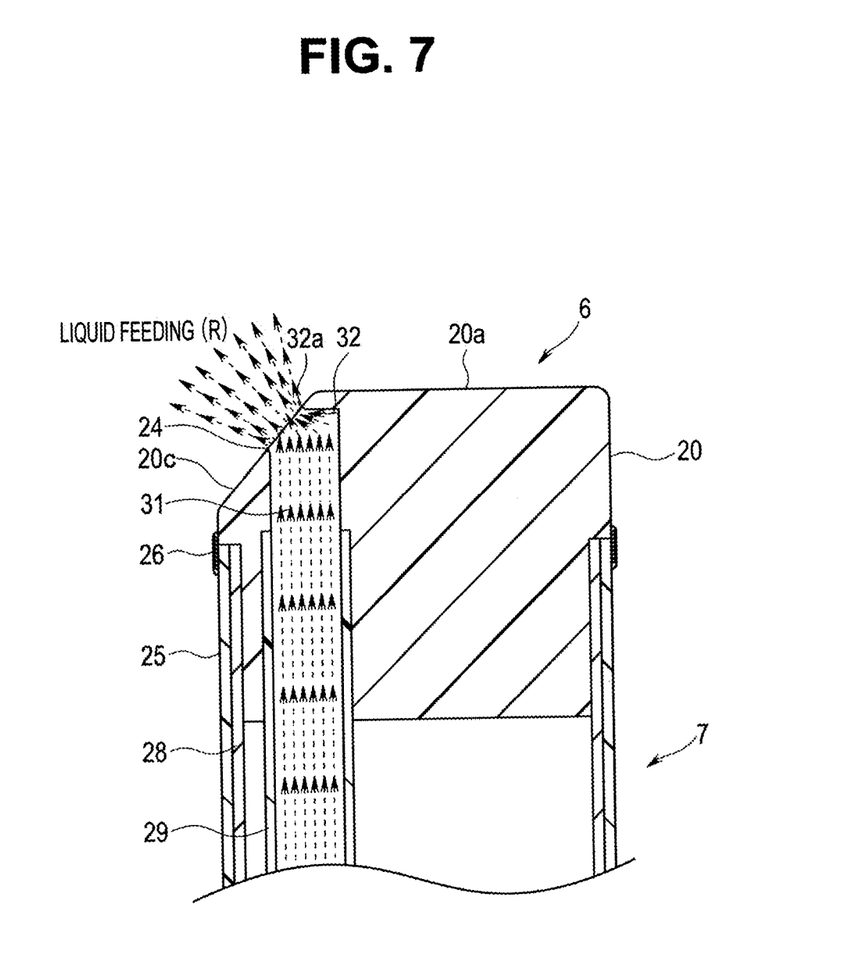
FIG. 7 is a sectional view of the distal end part of the insertion portion for describing a flow of a fluid ejected from a liquid feeding passage according to the aspect of the present disclosure.

More specifically, as for the flow of the fluid inside the flow passage, as illustrated in FIG. 7, the fluid flows in the liquid feeding passage 31 in a manner that is similar to a flow in a normal conduit. However, the flow of a part of the fluid, the part colliding with the deflection surface 32 provided in the direction intersecting with the liquid feeding passage 31, is guided to a flow in a direction intersecting with the longitudinal direction of the insertion portion 2 and the flow of a part of the fluid, the part not colliding with the deflection surface 32, flows in the longitudinal direction of the insertion portion 2 but a part of such fluid part flows in the direction intersecting with the longitudinal direction of the insertion portion 2 by being blocked by the fluid part colliding with the deflection surface 32, and thus, the ejection direction is guided.

Concurrently with the above, when the liquid is suctioned from the channel opening 23 of the distal end rigid portion 20 of the distal end portion 6 (suction S), a predetermined vortex flow V is generated in the liquid subjected to the liquid feeding R. In other words, as a result of the liquid ejected to the outer (lateral) and obliquely front side from the distal end rigid portion 20 colliding with a body cavity inner wall 101 on the side that is opposite to the suction port 23 and different from the direction of the suction S and being suctioned from the channel opening 23 to the inside of the insertion portion 2, a vortex flow V is generated ahead of the distal end portion 6 (see FIG. 6).

In the endoscope 1 configured as described above, a predetermined vortex flow V generated by liquid feeding R and suction S causes, in particular, stone pieces resulting from a urinary tract stone such as a kidney stone, a ureteral stone, a bladder stone or a urethral stone being finely crushed via, e.g., transurethral lithotripsy, to be stirred by the liquid. Then, in the endoscope 1, the crushed stone pieces stirred by the liquid are suctioned from the channel opening 23 of the distal end portion 6 (suction S), enabling efficient removal and collection of the stone from the inside of the body cavity 100 such as the urinary tract.

In this way, in the endoscope 1 of the present embodiment, a vortex flow V is generated inside a body cavity 100 such as a urinary tract by liquid feeding R to stir pieces of a crushed ureteral stone by means of liquid feeding R and the pieces are suctioned (suction S), enabling efficient collection of the pieces from the channel opening 23.

Conventional endoscopes employ complex structures because of, e.g., a liquid feeding tube being flexed, an opening portion being formed in a lateral direction of a liquid feeding tube projecting in a distal end direction or a liquid feeding nozzle that guides a direction of liquid feeding from a liquid feeding channel, resulting in, e.g., an increase in maximum outer diameter of a distal end portion and an insertion portion and an increase in length of the distal end portion.

On the other hand, the endoscope 1 according to the present embodiment has a simple structure with no need for a separate member in comparison with the conventional configurations, by the deflection surface 32 that guides a direction of liquid feeding R being formed integrally with the distal end rigid portion 20 of the distal end portion 6, and enables a decrease in outer diameter and length of the distal end rigid portion 20.

First Modification

Figure 8:
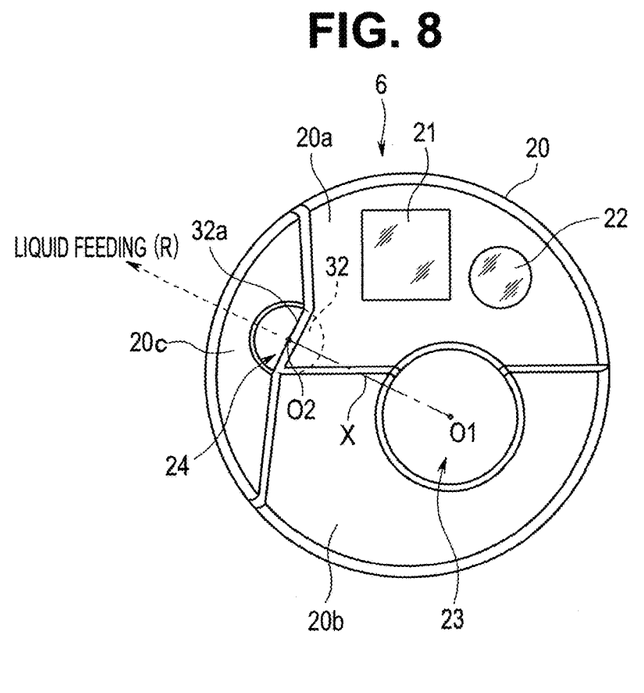
FIG. 8 is a front view of a configuration of a distal end portion of an insertion portion of a first modification.

In an endoscope 1 according to the present modification, as illustrated in FIG. 8, a linear edge 32a of a deflection surface 32 that closes a liquid feeding opening 24 of a distal end rigid portion 20 of a distal end portion 6 is formed orthogonal to a line segment X connecting a center O1 of a channel opening 23 and a center O2 of the liquid feeding opening 24.

Consequently, a direction of liquid feeding R of a liquid ejected from the liquid feeding opening 24 becomes a direction along an extension of the line segment X, which is a direction away from the suction port 23, enabling generation of a stable vortex flow V, and thus, the endoscope 1 enables crushed stone pieces stirred by liquid feeding R inside a body cavity 100 to be more efficiently collected via suction S. In a plane perpendicular to the longitudinal direction of the insertion portion 2, an imaginary line connecting the center of the suction port O1 and the center of the fluid ejection port O2 defines a connection direction R, and the first direction is the same as the connection direction. The suction port 23 has a first central point O1, and the fluid ejection port 24 has a second central point O2. The deflection surface 32 covers a part of a first area of the fluid ejection port 24, and the first area of the fluid ejection port 24 is an area of the fluid ejection port 24 that is on a radially inner side of an imaginary line orthogonal to a straight line connecting the first central point O1 and the second central point O2.

Second Modification

Figure 9:
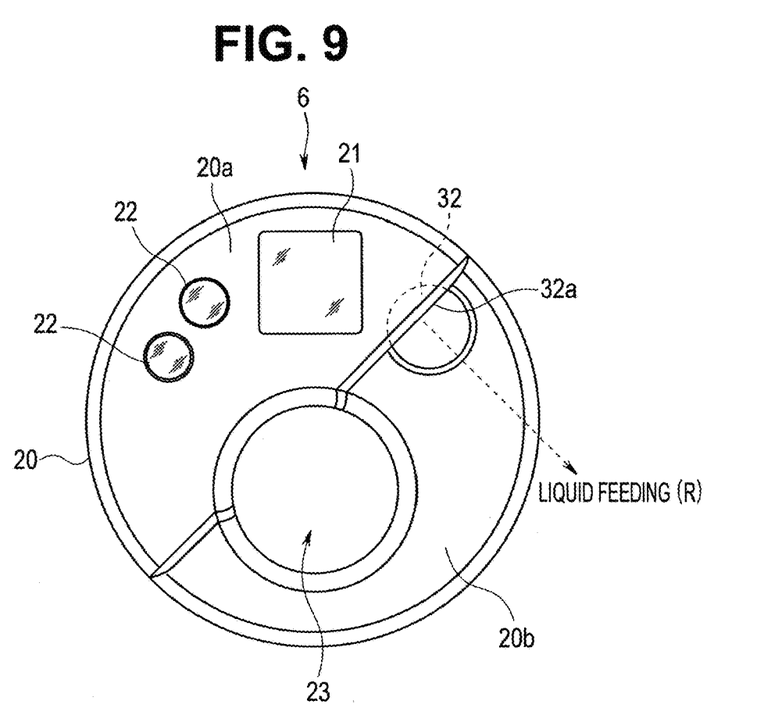
FIG. 9 is a front view illustrating a configuration of a distal end portion of an insertion portion of a second modification.

In an endoscope 1 of the present modification, as illustrated in FIG. 9, only a first surface 20a and a second surface 20b are formed on a distal end surface of a distal end rigid portion 20 of a distal end portion 6 and a liquid feeding opening 24 is disposed in the second surface 20b. The suction port 23 has a first central point, and the fluid ejection port 24 has a second central point. The deflection surface 32 covers a part of a first area of the fluid ejection port 24, and the first area of the fluid ejection port 24 is an area of the fluid ejection port 24 that is on a radially inner side of an imaginary line orthogonal to a straight line connecting the first central point and the second central point.

Even the endoscope 1 having the structure with the liquid feeding opening 24 disposed in such a manner above enables a vortex flow V to be generated by liquid feeding R inside a body cavity 100 and thus enables sufficient collection of crushed stone pieces of a crushed ureteral stone from a channel opening 23 by stirring the crushed stone pieces by means of the liquid feeding R and suctioning the crushed stone pieces (suction S).

Here, two illumination windows 22 are provided, and a light source that emits illuminating light may be a non-illustrated LED.

Third Modification

Figure 10:
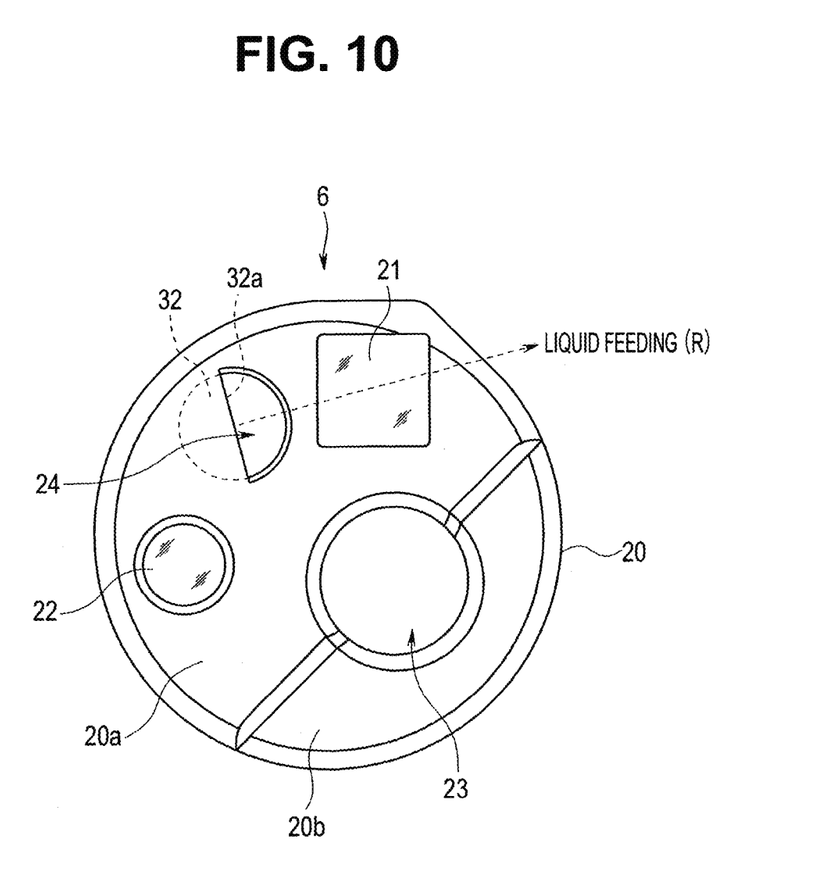
FIG. 10 is a front view illustrating a configuration of a distal end portion of an insertion portion of a third modification.

In an endoscope 1 of the present modification, as illustrated in FIG. 10, only a first surface 20a and a second surface 20b are formed on a distal end surface of a distal end rigid portion 20 of a distal end portion 6, and a liquid feeding opening 24 is disposed in the first surface 20a. A deflection surface 32 that closes a liquid feeding opening 24 of the distal end rigid portion 20 of the distal end portion 6 here is set in such a manner that a direction of liquid feeding R of a liquid ejected is a direction toward an observation window 21. The suction port 23 has a first central point, and the fluid ejection port 24 has a second central point. The deflection surface 32 covers a part of a first area of the fluid ejection port 24, and the first area of the fluid ejection port 24 is an area of the fluid ejection port 24 that is on a radially inner side of an imaginary line orthogonal to a straight line connecting the first central point and the second central point.

Consequently, in the endoscope 1, liquid feeding R of a liquid toward the observation window 21 enables liquid feeding to the outer side (lateral side) of the distal end portion 6 while removing dirt and the like adhering to the observation window 21. Therefore, the configuration of the endoscope 1 enables not only providing a predetermined vortex flow V ahead of the distal end portion 6 but also providing a clear field of view.

Fourth Modification

Figure 11:
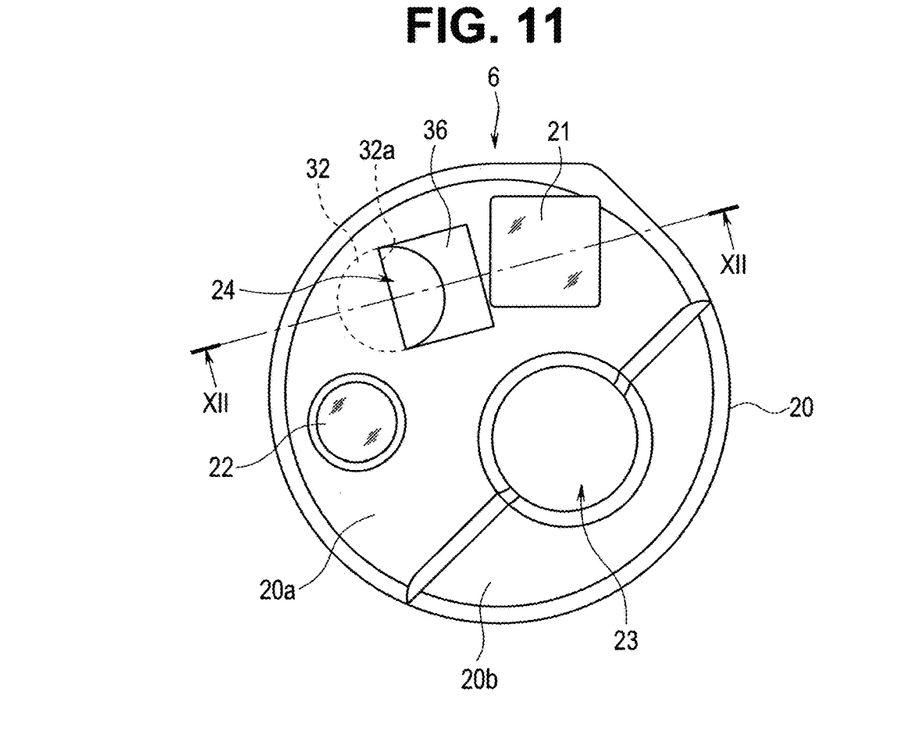
FIG. 11 is a front view illustrating a configuration of a distal end portion of an insertion portion of a fourth modification.
Figure 12:
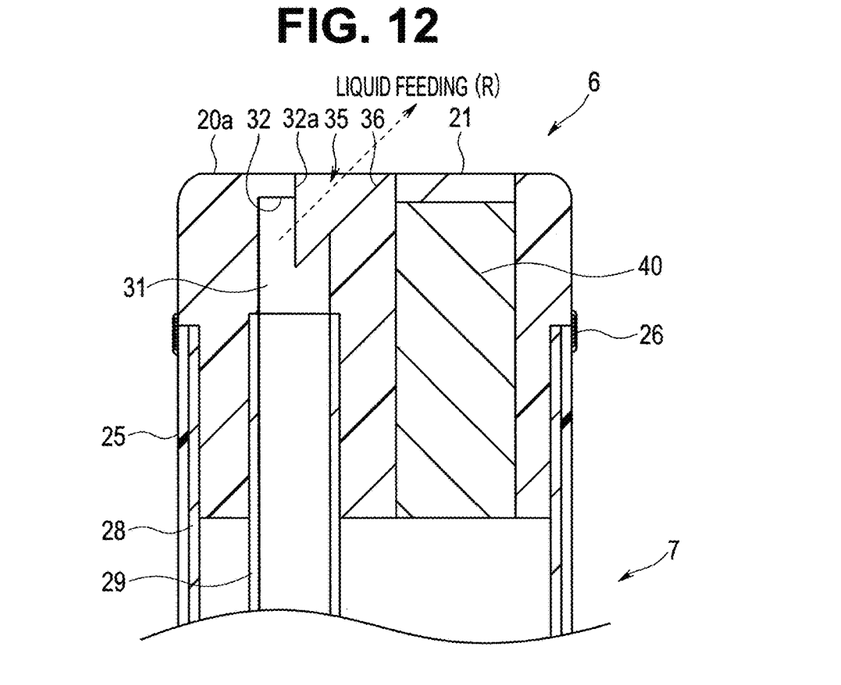
FIG. 12 is a sectional view illustrating a configuration of a distal end part of the insertion portion of the fourth modification along line XII-XII in FIG. 10.

In an endoscope 1 according to the present modification, as in the third modification and as illustrated in FIGS. 11 and 12, only a first surface 20a and a second surface 20b are formed on a distal end surface of a distal end rigid portion 20 of a distal end portion 6 and a liquid feeding opening 24 is disposed in the first surface 20a. The suction port 23 has a first central point, and the fluid ejection port 24 has a second central point. The deflection surface 32 covers a part of a first area of the fluid ejection port 24, and the first area of the fluid ejection port 24 is an area of the fluid ejection port 24 that is on a radially inner side of an imaginary line orthogonal to a straight line connecting the first central point and the second central point.

A deflection surface 32 that closes a liquid feeding opening 24 of the distal end rigid portion 20 of the distal end portion 6 here is set in such a manner that a direction of liquid feeding R of a liquid ejected is a direction toward an observation window 21, and in the first surface 20a of the distal end rigid portion 20 here, a recess portion 35 is formed by cutting, the recess portion 35 being in communication with a liquid feeding passage 31 and including a slanted surface 36 formed in the observation window 21 direction. Here, reference numeral 40 in FIG. 12 denotes an image pickup module. A portion of the deflection surface 32 is contacted by the fluid ejected from the fluid ejection port 24, and the portion of the deflection surface 32 redirects the fluid ejected from the fluid ejection port 24 in the first direction, and the portion of the deflection surface 32 includes a recess portion 35 including a slanted surface 36. The recess portion 35 includes a bottom surface. The first direction is toward an outer circumferential side closest to the fluid ejection port 24. The recess portion 35 comprises a side wall restricting the first direction Consequently, the endoscope 1 allows a liquid to easily flow to the observation window 21 along the slanted surface 36 of the recess portion 35, and as in the third modification, enables feeding the liquid to the outer side (lateral side) of the distal end portion 6 while removing dirt and the like adhering to the observation window 21 by means of the liquid feeding R, and thus, enables not only providing a predetermined vortex flow V ahead of the distal end portion 6 but also providing a clear field of view.

Fifth Modification

Figure 13:
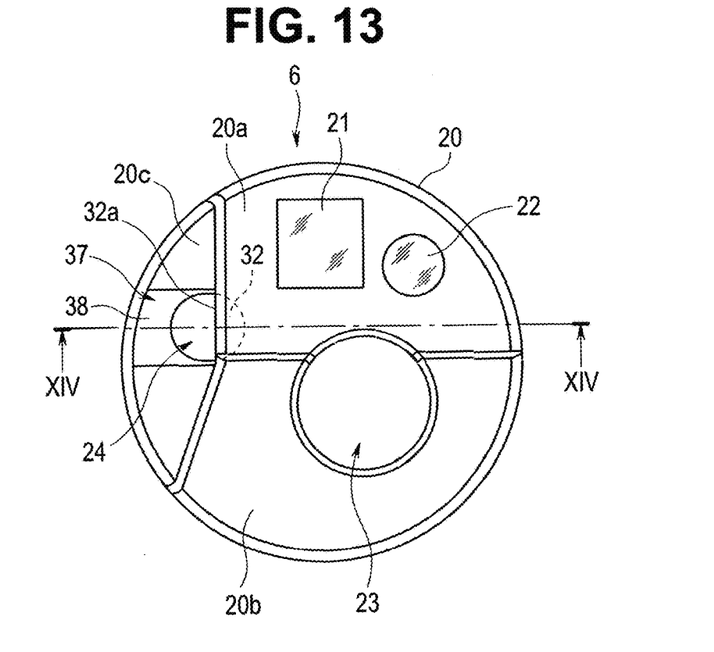
FIG. 13 is a front view illustrating a configuration of a distal end portion of an insertion portion of a fifth modification.
Figure 14:
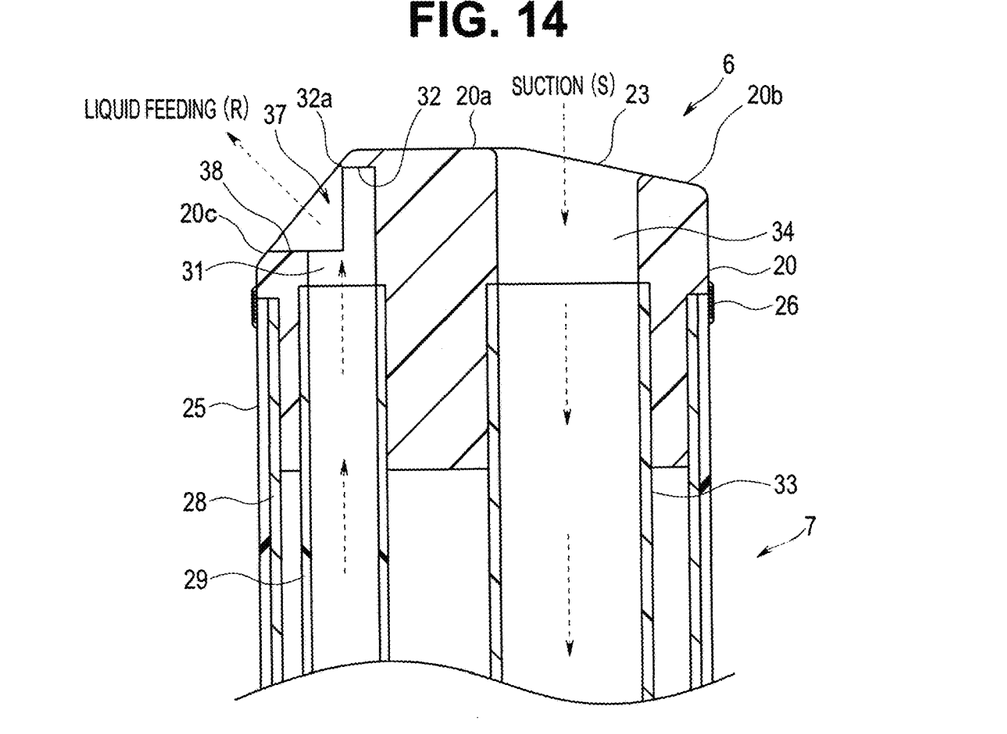
FIG. 14 is a sectional view illustrating a configuration of a distal end part of the insertion portion of the fifth modification along line XIV-XIV in FIG. 12.

In an endoscope 1 of the present modification, as illustrated in FIGS. 13 and 14, a recess portion 37 that is in communication with a liquid feeding passage 31 and that includes a bottom surface 38 is formed in such a manner as to be directed toward the outer circumferential side, by cutting, in a third surface 20c of a distal end rigid portion 20. Here, a distal end part of the liquid feeding passage 31 has an L shape resulting from cutting for formation of the recess portion 37. The suction port 23 has a first central point, and the fluid ejection port 24 has a second central point. The deflection surface 32 covers a part of a first area of the fluid ejection port 24, and the first area of the fluid ejection port 24 is an area of the fluid ejection port 24 that is on a radially inner side of an imaginary line orthogonal to a straight line connecting the first central point and the second central point.

In other words, a liquid feeding opening 24, which is a fluid ejection port 24, includes an L-shape opening including an opening portion provided in the third surface 20c, which is an inclined surface, the L-shape opening being orthogonal to a longitudinal axis of the liquid feeding passage 31. The second surface 20c comprises a fourth surface and a fifth surface. An opening portion of the L-shape opening is inclined relative to a longitudinal direction of the flow passage. The L-shape opening is formed by a first side surface, a second side surface and a bottom surface. The first side surface extends from the fourth surface to the fluid ejection port, the second side surface extends from the fifth surface to the fluid ejection port, and the bottom surface connects the first side surface and the second side surface.

Even the endoscope 1 including the liquid feeding passage 31 having such shape enables a vortex flow V to be generated inside a body cavity 100 by ejected liquid feeding R further to the lateral side and thus enables sufficient collection of crushed stone pieces of a crushed ureteral stone from a channel opening 23 by stirring the crushed stone pieces by means of the liquid feeding R and suctioning the crushed stone pieces (suction S).

The disclosure described in the embodiment and modifications above are not limited to the above-described embodiment and modifications, and in the practical phase, various modifications are possible without departing from the gist of the disclosure. Furthermore, the embodiment and modifications include various phases of the disclosure, and various aspects of the disclosure can be extracted by appropriate combinations of a plurality of elements disclosed.

For example, even in a case where some elements are removed from all the elements indicated in the embodiment and modifications, a configuration with such elements removed may be extracted as an aspect of the disclosure if such configuration can solve the aforementioned problem and provide the aforementioned effects.

(Example 1) An endoscope comprising:
  a distal end portion provided in a distal end of an insertion portion, an observation window being provided in the distal end portion;
  a fluid ejection port formed in a distal end surface of the distal end portion;
  a flow passage formed in the distal end portion, the flow passage allowing feeding of a fluid that is ejected from the fluid ejection port;
  a suction port formed in the distal end surface;
  a suction passage that allows suction of the fluid from the suction port to an inside of the insertion portion; and
  a deflection section formed integrally with the distal end portion in such a manner as to project to cover a part of the fluid ejection port, the deflection section shifting an ejection direction of the fluid to a direction away from a position at which the suction port is formed, by making the fluid collide with the deflection section.

(Example 2) The endoscope according to Example 1, wherein the fluid ejection port is formed in a second surface formed on the distal end surface, the second surface being inclined at a predetermined angle to a plane orthogonal to a longitudinal direction of the insertion portion, the second surface being different from the first surface.

(Example 3) The endoscope according to Example 2, wherein the suction port is formed in a first surface formed on the distal end surface, the first surface being inclined at a predetermined angle to a plane orthogonal to a longitudinal direction of the insertion portion.

(Example 4) The endoscope according to Example 3, wherein:
each of the first surface and the second surface is an inclined surface inclined to a proximal end side in such a manner as to be directed to a lateral side of the distal end portion; and
the deflection section is formed in such a manner as to project to shift the ejection direction of the fluid to a lateral and obliquely front side so that the ejection direction is shifted away from the suction port of the distal end portion.

(Example 5) The endoscope according to Example 4, wherein the deflection section shifts the ejection direction of the fluid onto an extension of a line segment connecting respective centers of the suction port and the fluid ejection port.

(Example 6) The endoscope according to Example 1, wherein:
the suction port is formed in a surface formed on the distal end surface, the surface being inclined at a predetermined angle to a plane orthogonal to a longitudinal direction of the insertion portion; and
the fluid ejection port and at least a part of the suction port are formed in the surface.

(Example 7) The endoscope according to Example 1, wherein the deflection section is formed in such a manner as to project to shift the ejection direction of the fluid to a direction toward the observation window.

(Example 8) The endoscope according to Example 7, wherein in the distal end rigid portion, a recess portion is formed in the distal end surface, the recess portion being in communication with the flow passage and including a slanted surface formed in such a manner as to be directed toward the observation window.

(Example 9) The endoscope according to Example 1, wherein the deflection section is formed in such a manner as to project to shift the ejection direction of the fluid to a direction that is different from respective directions toward the observation window and the suction port.

(Example 10) The endoscope according to Example 1, wherein in the distal end rigid portion, a recess portion that is in communication with the flow passage and includes a bottom surface is formed in such a manner as to be directed toward an outer circumferential side.

(Example 11) The endoscope according to Example 1, wherein the fluid ejection port includes an L-shape opening provided in an inclined surface formed on the distal end portion, the L-shape opening being orthogonal to a longitudinal direction of the flow passage.

(Example 12) The endoscope according to Example 1, wherein the endoscope is a single-use endoscope.

What is claimed is:

1. An endoscope, comprising:
an insertion portion comprising a distal end portion, the distal end portion including a distal end surface;
a flow passage including a fluid ejection port formed in the distal end surface, the flow passage configured to supply a fluid via the fluid ejection port; and
a suction passage including a suction port formed in the distal end surface,
wherein the distal end portion includes a protrusion having:
a first surface on a first side,
a deflection surface on a second side, the deflection surface located proximally relative to the first surface of the protrusion, and
an edge surface connecting the first surface to the deflection surface, the edge surface inclined with respect to the first surface of the protrusion,
wherein the first surface extends in a plane of the distal end surface, the plane of the distal end surface is orthogonal to a longitudinal direction of the distal end portion, and the deflection surface covers a part of the fluid ejection port,
wherein the deflection surface is configured to deflect the fluid supplied via the fluid ejection port in a first direction,
wherein the first direction does not intersect the suction port, and
wherein the distal end portion includes a recess portion recessed from the first surface and including a slanted surface.

2. The endoscope according to claim 1, wherein the fluid ejection port is located in a plane of the edge surface.

3. The endoscope according to claim 2, wherein a portion of the distal end surface in which the suction port is located defines a third surface and the third surface is inclined with respect to the first surface of the protrusion.

4. The endoscope according to claim 3, wherein the edge surface is inclined with a radially outermost edge of the edge surface being more proximal than a radially innermost edge of the edge surface, and
wherein the third surface is inclined with a radially outermost edge of the third surface being more proximal than a radially innermost edge of the third surface.

5. The endoscope according to claim 4, wherein the first direction is inclined with respect to a longitudinal axis of the insertion portion.

6. The endoscope according to claim 4, wherein, in a plane perpendicular to the longitudinal direction of the distal end portion, an imaginary line connecting a center of the suction port and a center of the fluid ejection port defines a connection direction, and the first direction is the same as the connection direction.

7. The endoscope according to claim 1, wherein the distal end portion comprises an L-shape opening in the edge surface, and wherein an opening portion of the L-shape opening is inclined relative to a longitudinal direction of the flow passage.

8. The endoscope according to claim 1, wherein the distal end portion comprises an observation window, and
wherein the first direction intersects a field of view of the observation window.

9. An endoscope, comprising;
an insertion portion comprising a distal end portion, the distal end portion including a distal end surface;
a flow passage including a fluid ejection port formed in the distal end surface, the flow passage configured to supply a fluid via the fluid ejection port; and
a suction passage including a suction port formed in the distal end surface,
wherein the distal end portion includes a protrusion having a first surface on a first side, a deflection surface on a second side, and an edge surface connecting the first surface to the deflection surface, where the first surface extends in a plane of the distal end surface, the plane of the distal end surface is orthogonal to a longitudinal direction of the distal end portion, and the deflection surface covers a part of the fluid ejection port,
wherein the deflection surface is configured to deflect the fluid supplied via the fluid ejection port in a first direction, wherein the first direction does not intersect the suction port, wherein the distal end portion includes a recess portion recessed from the edge surface, and wherein the first direction is toward an outer circumferential side of the distal end portion closest to the fluid ejection port.

10. The endoscope according to claim 9, wherein the recess portion comprises a bottom surface extending along a radial direction, and a side wall restricting the first direction.

11. The endoscope according to claim 1, wherein the endoscope is a single-use endoscope.

12. The endoscope according to claim 1, wherein the flow passage has a first diameter, wherein the fluid ejection port has a second diameter, and wherein the deflection surface covers the part of the fluid ejection port so that the second diameter is smaller than the first diameter.

13. The endoscope according to claim 1, wherein an entire length of the flow passage in the distal end portion is straight, extending in the longitudinal direction of the distal end portion.

14. The endoscope according to claim 1, wherein the fluid ejection port has a first central point and the suction port has a second central point, and wherein a first area of the fluid ejection port is on a linear edge of the deflection surface, where the linear edge of the deflection section is orthogonal to a straight line connecting the first central point and the second central point.

15. The endoscope according to claim 1, wherein the flow passage is formed in the insertion portion, wherein the suction passage is formed in the insertion portion, wherein the protrusion is formed integrally with the distal end portion, wherein the fluid ejection port and the suction port are spaced apart from a longitudinal axis of the distal end portion, and wherein the flow passage is configured to supply the fluid to an environment outside of the insertion portion.

16. The endoscope according to claim 1, wherein a plane of the deflection surface is parallel to the plane of the distal end surface.

17. The endoscope according to claim 1, wherein the distal end surface includes an observation window and an illumination window.

* * * * *